United States Patent
Yu et al.

(10) Patent No.: US 9,590,833 B2
(45) Date of Patent: Mar. 7, 2017

(54) RECEPTION OF 2-SUBCARRIERS COHERENT ORTHOGONAL FREQUENCY DIVISION MULTIPLEXED SIGNALS

(71) Applicant: ZTE Corporation, Shenzhen (CN)

(72) Inventors: Jianjun Yu, Basking Ridge, NJ (US); Fan Li, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 122 days.

(21) Appl. No.: 14/453,471

(22) Filed: Aug. 6, 2014

(65) Prior Publication Data

US 2016/0028577 A1 Jan. 28, 2016

Related U.S. Application Data

(60) Provisional application No. 61/863,201, filed on Aug. 7, 2013.

(51) Int. Cl.

| H04B 10/61 | (2013.01) |
|---|---|
| H04L 27/26 | (2006.01) |
| H04L 25/02 | (2006.01) |
| H04L 1/00 | (2006.01) |
| H04B 10/516 | (2013.01) |
| H04L 27/38 | (2006.01) |
| H04L 27/34 | (2006.01) |

(52) U.S. Cl.
CPC ..... *H04L 27/2659* (2013.01); *H04B 10/5161* (2013.01); *H04B 10/611* (2013.01); *H04B 10/612* (2013.01); *H04L 1/0054* (2013.01); *H04L 25/0204* (2013.01); *H04L 27/265* (2013.01); *H04L 27/2697* (2013.01); *H04L 27/2698* (2013.01); *H04L 27/3422* (2013.01); *H04L 27/3818* (2013.01); *H04L 27/34* (2013.01)

(58) Field of Classification Search
CPC .................................................. H04B 10/611
See application file for complete search history.

(56) References Cited

U.S. PATENT DOCUMENTS

| 6,493,397 B1 | 12/2002 | Takahashi et al. |
|---|---|---|
| 2005/0286908 A1 | 12/2005 | Way |

(Continued)

FOREIGN PATENT DOCUMENTS

| JP | 09-238173 A | 9/1997 |
|---|---|---|
| JP | 11-196146 A | 7/1999 |

OTHER PUBLICATIONS

Yu et al., "Transmission of 8×480-Gb/s super-Nyquist-filtering 9-QAM-like signal at 100 GHz-grid over 5000-km SMF-28 and twenty-five 100 GHz-grid ROADMs," Opt. Express 21, 15686-15691 (2013).*

(Continued)

*Primary Examiner* — Nathan Curs
(74) *Attorney, Agent, or Firm* — Perkins Coie LLP

(57) ABSTRACT

A dual-polarization, 2-subcarriers code orthogonal, orthogonal frequency division multiplexed signal carrying information bits is transmitted in an optical communication network without transmitting a corresponding pilot tone or training sequence. A receiver receives the transmitted signal and recovers information bits using a blind equalization technique and by equalizing the 2-subcarriers OFDM signal as a 9-QAM signal in time domain with a CMMA (constant multi modulus algorithm) equalization method.

20 Claims, 12 Drawing Sheets

(56) References Cited

U.S. PATENT DOCUMENTS

| | | | |
|---|---|---|---|
| 2008/0123739 A1* | 5/2008 | Reznic | H04L 27/2604 375/240.08 |
| 2009/0190926 A1 | 7/2009 | Charlet et al. | |
| 2010/0111543 A1 | 5/2010 | Chow et al. | |
| 2010/0150577 A1 | 6/2010 | Essiambre et al. | |
| 2012/0148261 A1 | 6/2012 | Yu | |
| 2012/0155890 A1* | 6/2012 | Zhou | H04B 10/6165 398/208 |
| 2012/0163831 A1 | 6/2012 | Eiselt | |
| 2013/0089339 A1* | 4/2013 | Liu | H04B 10/112 398/152 |
| 2015/0110492 A1 | 4/2015 | Yu et al. | |
| 2015/0222368 A1 | 8/2015 | Yu | |

OTHER PUBLICATIONS

Lowery, A.J., "Improving Sensitivity and Spectral Efficiency in Direct-Detection Optical OFDM Systems," Optical Fiber Communication Conference and Exposition, and the National Fiber Optic Engineers Conference (OFC/NFOEC), San Diego, CA, Paper OMM4, pp. 1-3, Feb. 2008.
Peng, W.-R., et al., "Per-symbol-based digital back-propagation approach for PDM-CO-OFDM transmission systems," Optics Express, 21(2):1547-1554, Jan. 2013.
Yu, J., et al "1.96 Tb/s (21×100 Gb/s) OFDM Optical Signal Generation and Transmission Over 3200-km Fiber," IEEE Photonics Technology Letters, 23(15):1061-1063, Aug. 2011.
Zhang, J., et al., "Improved Quadrature Duobinary System Performance Using Multi-Modulus Equalization," IEEE Photonics Technology Letters, 25(16):1630-1633, Aug. 2013.
Zhou, X., et al., "64-Tb/s, 8 b/s/Hz, PDM-36QAM Transmission Over 320 km Using Both Pre- and Post-Transmission Digital Signal Processing," Journal of Lightwave Technology, 29(4):571-577, Feb. 2011.
Zhou, X., et al., "PDM-Nyquist-32QAM for 450-Gb/s Per-Channel WDM Transmission on the 50 GHz ITU-T Grid," Journal of Lightwave Technology, 30(4):553-559, Feb. 2012.
Armstrong, J., "OFDM for Optical Communications," Journal of Lightwave Technology, 27(3):189-204, Feb. 2009.
Cao, Z., et al., "Direct-Detection Optical OFDM Transmission System Without Frequency Guard Band," IEEE Photonics Technology Letters, 22(11):736-738, Jun. 2010.
Jansen, S.L., et al., "Coherent Optical 25.8-Gb/s OFDM Transmission Over 4160-km SSMF," Journal of Lightwave Technology, 26(1):6-15, Jan. 2008.
Kobayashi, T., et al., "Over 100 Gb/s Electro-Optically Multiplexed OFDM for High-Capacity Optical Transport Network," Journal of Lightwave Technology, 27(16):3714-3720, Aug. 2009.
Li, C., et al., "Investigation of Coherent Optical Multiband DFT-S OFDM in Long Haul Transmission," IEEE Photonics Technology Letters, 24(19):1704-1707, Oct. 2012.
Peng, W.-R., et al., "Simple Carrier Recovery Approach for RF-Pilot-Assisted PDM-CO-OFDM Systems," Journal of Lightwave Technology, 31(15):2555-2564, Aug. 2013.
Tao, L., et al., "Analysis of Noise Spread in Optical DFT-S OFDM Systems," Journal of Lightwave Technology, 30 (20):3219-3225, Oct. 2012.
Wang, H., et al., "APSK Modulated CO-OFDM System With Increased Tolerance Toward Fiber Nonlinearities," IEEE Photonics Technology Letters, 24(13):1085-1087, Jul. 2012.
Yang, Q., et al., "Guard-band influence on orthogonal-band-multiplexed coherent optical OFDM," Optics Letters, 33 (19):2239-2241, Oct. 2008.
Zhang, J., et al., "Multi-Modulus Blind Equalizations for Coherent Quadrature Duobinary Spectrum Shaped PM-QPSK Digital Signal Processing," Journal of Lightwave Technology, 31(7):1073-1078, Apr. 2013.
Hang, J.H., et al., "Filtering Tolerance of 108-Gb/s PolMux Quadrature Duobinary Signal on 25-GHz Grid," Optical Fiber Communication Conference and Exposition, and the National Fiber Optic Engineers Conference (OFC/NFOEC), Los Angeles, CA, Paper OMR4, pp. 1-3, Mar. 2011.
Chien, H.-C., et al., "Performance Assessment of Noise-suppressed Nyquist-WDM for Terabit Superchannel Transmission," Journal of Lightwave Technology, 30(24):3965-3971, Jul. 2012.
Dong, Z., et al., "7×224 Gb/s/ch Nyquist-WDM Transmission Over 1600-km SMF-28 Using PDM-CSRZ-QPSK Modulation", IEEE Photonics Technology Letters, 24(13):1157-1159, Jul. 2012.
European Search Report mailed on Aug. 3, 2015 for European Patent Application No. 13827264.6, filed Aug. 8, 2013 (8 pages).
Fatadin, I., et al., "Compensation of Frequency Offset for 16-QAM Optical Coherent Systems Using QPSK Partitioning", IEEE Photonics Technology Letters, 23(17)1246-1248, Sep. 2011.
Gao, Y., et al., "Low-Complexity Two-Stage Carrier Phase Estimation for 16-QAM Systems using QPSK Partitioning and Maximum Likelihood Detection," Optical Fiber Communication Conference and Exposition, and the National Fiber Optic Engineers Conference (OFC/NFOEC), Los Angeles, CA, Paper OMJ6, pp. 1-3, Mar. 2011.
International Search Report and Written Opinion mailed on Nov. 14, 2013 for International Application No. PCT/JS2013/054201, filed Aug. 8, 2013 (7 pages).
Japanese Office Action mailed on Feb. 23, 2016 for Japanese Patent Application No. 2015-526718, filed Aug. 8, 2013 (7 pages).
Jia, Z., et al., "Field Transmission of 100 G and Beyond: Multiple Baud Rates and Mixed Line Rates Using Nyquist-WDM Technology," Journal of Lightwave Technology, 30(24):3793-3804, Dec. 2012.
Kikuchi, K., et al., "Coherent Demodulation of Optical Quadrature Duobinary Signal with Spectral Efficiency of 4 bit/sHz per Polarization," 33rd European Conference and Exhibition of Optical Communication (ECOC), Berlin, Germany, Japer 9.3.4, pp. 1-2, Sep. 2007.
Leven A. et al "Frequency Estimation in Intradyne Reception," IEEE Photonics Technology Letters, 19(6):366-368, Mar. 2007.
Li, J., et al."Approaching Nyquist Limit in WDM Systems by Low-Complexity Receiver-Side Duobinary Shaping," Journal of Lightwave Technology, 30(11):1664-1676, Jun. 2012.
Li, J., et al. "Spectrally Efficient Quadrature Duobinary Coherent Systems With Symbol-Rate Digital Signal Processing", Journal of Lightwave Technology, 29(8):1098-1104, Apr. 2011.
Lyubomirsky, I., "Quadrature Duobinary for High-Spectral Efficiency 100G Transmission," Journal of Lightwave Technology, 28(1):91-96, Jan. 2010.
Lubomirsky, I., "Quadrature Duobinary Modulation for 100G Transmission Beyond the Nyquist Limit," Optical Fiber Communication Conference and Exposition, and the National Fiber Optic Engineers Conference (OFC/NFOEC), San Diego, CA, Paper OThM4, pp. 1-3, Mar. 2010.
Mach, F., et al., "111-Gb/s PolMux-Quadrature Duobinary for Robust and Bandwidth Efficient Transmission," IEEE Photonics Technology Letters, 22(11):751-753, Jun. 2010.
Pfau, T., et al., "Hardware-Efficient Coherent Digital Receiver Concept With Feedforward Carrier Recovery for M-QAM Constellations," Journal of Lightwave Technology, 27(8):989-999, Apr. 2009.
Viterbi, A., et al., "Nonlinear Estimation of PSK-Modulated Carrier Phase with Application to Burst Digital Transmission," IEEE Transactions on Information Theory, 29(4):543-551, Jul. 1983.
Winzer, P.J., et al., "Spectrally Efficient Long-Haul Optical Networking Using 112-Gb/s Polarization-Multiplexed 16-QAM," Journal of Lightwave Technology, 28(4):547-556, Feb. 2010.
Yu, J., et al., "Field Trial Nyquist-WDM Transmission of 8×216. 4Gb/s PDM-CSRZ-QPSK Exceeding 4b/s/Hz Spectral Efficiency," Optical Fiber Communication Conference and Exposition, and the National Fiber Optic Engineers conference (OFC/NFOEC), Los Angeles, CA, Paper PDP5D.3, pp. 1-3, Mar. 2012.
Zhou, X., et aL, "Multi-Level, Multi-Dimensional Coding for High-Speed and High-Spectral-Efficiency Optical Transmission," Journal of Lightwave Technology, 27(16):3641-3653, Aug. 2009.
Zhou, X., et al., "Transmission of 32-Tb/s Capacity Over 580 km Using RZ-Shaped PDM-8QAM Modulation Format and Cascaded

(56) References Cited

OTHER PUBLICATIONS

Multimodulus Blind Equalization Algorithm," Journal of Lightwave Technology, 28(4):456-465, Feb. 2010.
Zhou, X., et al., "Cascaded two-modulus algorithm for blind polarization de-multiplexing of 114-Gb/s PDM-8-QAM optical signals," Optical Fiber Communication Conference and Exposition, and the National Fiber Optic Engineers conference (OFC/NFOEC), San Diego, CA, Paper OWG3, pp. 1-3, Mar. 2009.

* cited by examiner

Table I

| Data on two subcarriers | | Two time slots in one OFDM symbol | |
|---|---|---|---|
| $c_0$ | $c_1$ | $s(0)$ | $s(1)$ |
| $(1+i)/\sqrt{2}$ | $(1+i)/\sqrt{2}$ | $0$ | $1+i$ |
| $(1+i)/\sqrt{2}$ | $(1-i)/\sqrt{2}$ | $i$ | $1$ |
| $(1+i)/\sqrt{2}$ | $(-1+i)/\sqrt{2}$ | $1$ | $i$ |
| $(1+i)/\sqrt{2}$ | $(-1-i)/\sqrt{2}$ | $1+i$ | $0$ |
| $(1-i)/\sqrt{2}$ | $(1+i)/\sqrt{2}$ | $-i$ | $1$ |
| $(1-i)/\sqrt{2}$ | $(1-i)/\sqrt{2}$ | $0$ | $1-i$ |
| $(1-i)/\sqrt{2}$ | $(-1+i)/\sqrt{2}$ | $1-i$ | $0$ |
| $(1-i)/\sqrt{2}$ | $(-1-i)/\sqrt{2}$ | $1$ | $-i$ |
| $(-1+i)/\sqrt{2}$ | $(1+i)/\sqrt{2}$ | $-1$ | $i$ |
| $(-1+i)/\sqrt{2}$ | $(1-i)/\sqrt{2}$ | $-1+i$ | $0$ |
| $(-1+i)/\sqrt{2}$ | $(-1+i)/\sqrt{2}$ | $0$ | $-1+i$ |
| $(-1+i)/\sqrt{2}$ | $(-1-i)/\sqrt{2}$ | $i$ | $-1$ |
| $(-1-i)/\sqrt{2}$ | $(1+i)/\sqrt{2}$ | $-1-i$ | $0$ |
| $(-1-i)/\sqrt{2}$ | $(1-i)/\sqrt{2}$ | $-1$ | $-i$ |
| $(-1-i)/\sqrt{2}$ | $(-1+i)/\sqrt{2}$ | $-i$ | $-1$ |
| $(-1-i)/\sqrt{2}$ | $(-1-i)/\sqrt{2}$ | $0$ | $-1-i$ |

FIG. 2

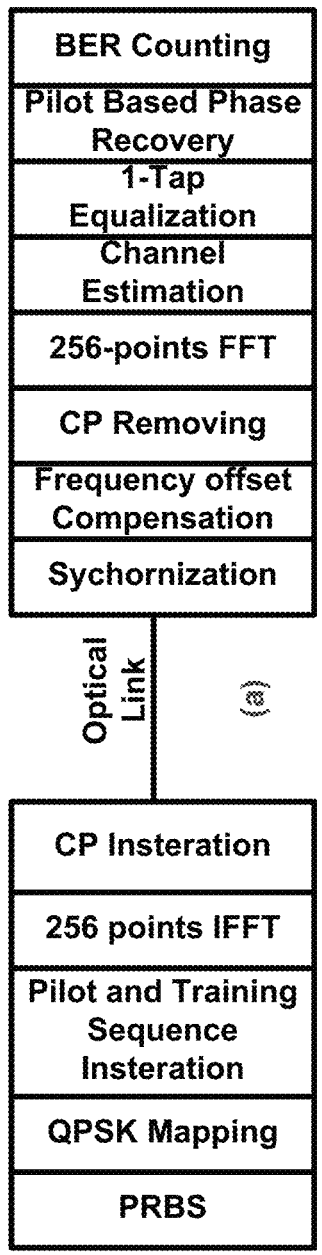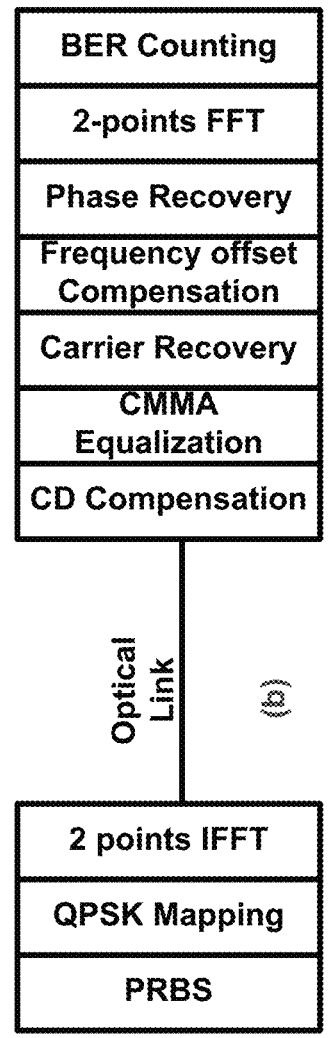
FIG. 5A
FIG. 5B

RECEPTION OF 2-SUBCARRIERS COHERENT ORTHOGONAL FREQUENCY DIVISION MULTIPLEXED SIGNALS

CROSS REFERENCE TO RELATED APPLICATION

This patent document claims the benefit of priority of U.S. Provisional Patent Application No. 61/863,201, filed on Aug. 7, 2013. The entire content of the before-mentioned patent application is incorporated by reference herein.

BACKGROUND

This document relates to optical communication systems.

With the advent of transmission of multimedia content such as video over the Internet and other communications networks, there is any ever-increasing need for increased data rate capacity on communication networks. Often, optical networks form backbones of communications networks, where the increased traffic at the edges of the network aggregates to several gigabit of network traffic. Therefore, optical communication techniques are being challenged to meet the demand on communications network data capacity. Laying down optical transmission media such as fiber optics often requires large amount of capital expenditure and may not always be a suitable options due to the expenses involved and other regulatory issues.

SUMMARY

The techniques disclosed in this document enable the use of dual-polarization, 2-subcarriers CO-OFDM (coherent optical, orthogonal frequency division multiplexed) transmission and reception in an optical network. In some embodiments, the transmitted signal can be received and decoded at the receiver using a blind equalization technique and by equalizing the 2-subcarriers OFDM signal as a 9-QAM signal in time domain with a CMMA (constant multi modulus algorithm) equalization method. Advantageously, robustness against nonlinear distortions experienced by transmitted signals and the effective transmission distance over which throughput can be maintained can be enhanced compared with tradition CO-OFDM transmission system based on frequency equalization with training sequence.

In one aspect, techniques are disclosed to facilitate recovery of information bits transmitted by an optical transmitter using a two-subcarrier orthogonal frequency division multiplexed (OFDM) signal in which each subcarrier is modulated using a 4 Quadrature Amplitude Modulation (QAM) constellation. At the receiver, the two-subcarrier OFDM signal is received, processed as a 9-QAM signal to generate a modulus signal and the information bits are recovered by applying a two point Fast Fourier Transform (FFT). In some embodiments, the method is implemented in a receiver apparatus comprising a memory and a processor.

These and other aspects, and their implementations and variations are set forth in the drawings, the description and the claims.

BRIEF DESCRIPTION OF THE DRAWINGS

FIG. 2 depicts example data and constellations before and after 2-point FFT for a 4-QAM signal.

FIGS. 5A-5B depict an example of offline digital signal processing performed in an optical receiver: (5A) traditional OFDM signal, and (5B) 2-subcarriers OFDM signal.

Like reference symbols in the various drawings indicate like elements.

DETAILED DESCRIPTION

Figure 1:
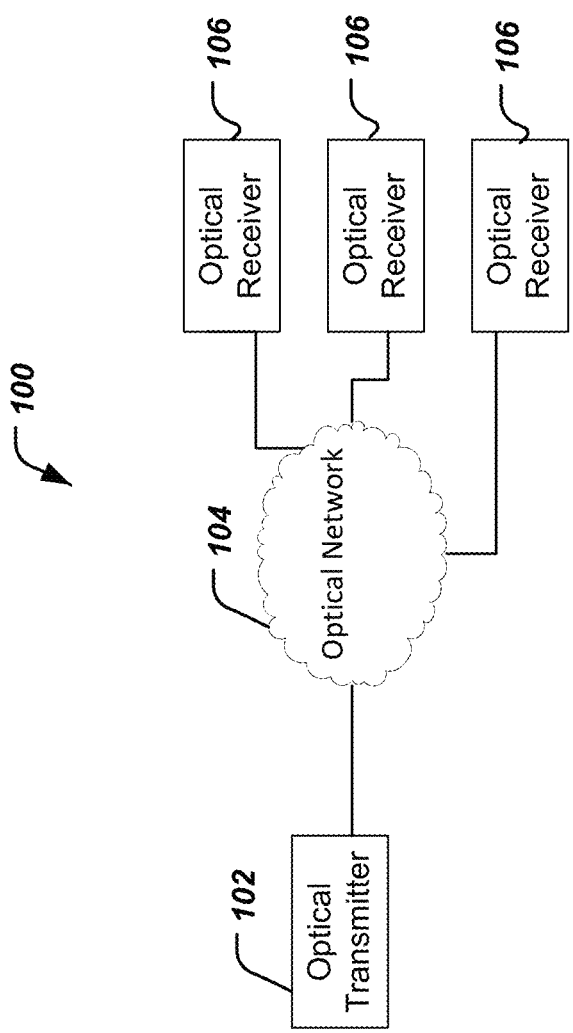
FIG. 1 depicts an architectural block diagram of an example of an optical communication system.

The techniques disclosed in this document enable the use of dual-polarization, 2-subcarriers CO-OFDM (coherent optical, orthogonal frequency division multiplexed) transmission and reception in an optical network. In some embodiments, the transmitted signal can be received and decoded at the receiver using a blind equalization technique and by equalizing the 2-subcarriers OFDM signal as a 9-QAM signal in time domain with CMMA (constant multi modulus algorithm) equalization method. The nonlinear effect resistance and transmission distance can be enhanced compared with tradition CO-OFDM transmission system based on frequency equalization with training sequence.

In the description below, several embodiments have been discussed with specific references to modulation and other physical layer parameter values. However, the general applicability of the principles discussed will be appreciated by one of skill in the art.

Optical orthogonal frequency division multiplexing (OFDM) has attracted a lot of attention due to its high spectral efficiency (SE) and robustness to transmission impairments enabled by digital signal processing (DSP). In the receiver of a traditional coherent OFDM transmission system, the frequency offset compensation (FOC), channel estimation, equalization, and phase recovery are implemented using training sequence (TS) and pilot tones. Because the TS and pilot tones are used in the frequency domain equalization schemes, the number of subcarriers in the OFDM modulation/demodulation with IFFT/FFT (inverse fast Fourier transform, fast Fourier transform) is usually larger than 64 in order to reduce the overhead and to acquire more accurate channel estimation. Unfortunately, an OFDM signal with large IFFT/FFT size has high peak-to-average power ratio (PAPR) values. A high PAPR typically leads to distortion in electrical devices, optical modulators, and fiber nonlinear effects in the optical OFDM transmission systems. If the peak of the OFDM signal is beyond the linearity area of the high power amplifiers (HPAs), the dynamic range of digital-to-analog converters (DACs), or the optical modulator, the subcarriers of the OFDM signal may lose their orthogonality. A high PAPR can also cause nonlinear effects in the fiber transmission when the optical launch power into the transmission fiber is very high.

Many techniques have been proposed to reduce the PAPR of OFDM signal. However, the PAPR of OFDM signal is still very high in these techniques. One possible approach is to reduce the number of subcarriers in the OFDM modulation with IFFT. The PAPR of OFDM signal can be reduced with the reduction of the number of subcarriers. In conventional techniques where some subcarriers are allocated to pilot tones or training sequences, the reduction in total number of subcarriers may result in an increased overhead and the channel estimation based on TS in frequency domain cannot effectively work.

The techniques disclosed herein can be used, e.g., to eliminate the use of pilot tones and training sequences that burden transmitted signals with non-data overhead. In some embodiments, receiver-side signal processing may convert received modulated OFDM signals into a constant modulus signal and use receiver side signal processing that performs blind equalization, e.g., without relying on a priori knowledge of signals such as in the case of pilot tones and training sequences. These, and other, advantages and aspects are described in the present document.

FIG. 1 is a block diagram representation of an example of an optical communication system 100 where the subject technology of this document can be implemented. An optical transmitter 102 transmits optical signals through an optical network 104 to one or more optical transceivers 106. The transmitted optical signals may go through intermediate optical equipment such as amplifiers, repeaters, switch, etc., which are not shown in FIG. 1 for clarity.

The technique disclosed in this document can be implemented in an OFDM transmission system that uses an optical or another (e.g., air) transmission medium by using OFDM symbols consisting of only two subcarriers, e.g., at an optical transceiver 106 or at the optical transmitter 102. A two-subcarrier OFDM signal is processed as a 9-QAM signal in the time domain, and therefore it can be blindly equalized with cascaded multi-modulus algorithm CMMA equalization method in the time domain. With the blind equalization in the time domain, the FOC, channel estimation and phase recovery can be implemented without TS and pilot tones. The overhead in the traditional optical OFDM transmission systems due to pilot tones and training sequences can be completely eliminated in the two-subcarrier optical OFDM transmission system with blind equalization receiver.

In some embodiments, the BER of a 48 Gb/s dual-polarization 2-subcarriers OFDM signal is less than the pre-forward-error-correction (pre-FEC) threshold of $3.8 \times 10^{-3}$ after 5600-km single-mode fiber-28 (SMF-28) transmission, while a 32.1 Gbit/s dual-polarization traditional 256-subcarriers OFDM signal can be only transmitted 3500-km under the pre-FEC threshold of $3.8 \times 10^{-3}$. The nonlinear effect resistance and transmission distance of 2-subcarriers OFDM with blind equalization can be enhanced, compared with traditional OFDM transmission system based on frequency equalization with a training sequence.

If the IFFT size during the OFDM modulation is N (a natural number, typically a power of 2) and the time length of one OFDM symbol is T, then after IFFT, the OFDM signal as a function of time t can be expressed as $$s(t) = \sum_{k=0}^{N-1} c_k \exp(j2\pi f_k t)(1 \le t \le T) \quad (1)$$

where k represents the index of subcarriers, $c_k$ is the modulated data and $f_k$ is the frequency of the $k^{th}$ subcarrier and can be given as:

$$f_k = k\Delta f = k/T \quad (2)$$

In a 2-subcarriers scheme, the N and the time length of OFDM symbol are both only 2 when only 2-subcarriers are used in OFDM modulation and demodulation, and the expression can be simplified as:

$$s(t) = \frac{1}{\sqrt{2}} \sum_{k=0}^{1} c_k \exp(j2\pi f_k t) \quad (3)$$
$$= \frac{1}{\sqrt{2}} \left( c_0 + c_1 \exp\left(j2\pi \frac{t}{2}\right) \right)(1 \le t \le 2)$$

where $c_0$ and $c_1$ represent the data modulated onto 2-subcarriers, respectively. After IFFT, the OFDM symbols are generated and one OFDM symbol including two samples. Two samples are denoted by time slot 1 and time slot 2 in the following part, and can be expressed as:

$$s(0) = \frac{1}{\sqrt{2}}(c_0 - c_1) \quad (4)$$
$$s(1) = \frac{1}{\sqrt{2}}(c_0 + c_1)$$

Table I in FIG. 2 shows the data before and after 2-point IFFT. Data on 2-subcarriers in frequency domain represents data before IFFT, while two time slots in one OFDM symbol in time domain indicate data after IFFT. The data on 2-subcarriers (which has four different possible values) is obtained under the 4-QAM mapping rules, and two time slots in one OFDM symbol can be calculated via Eq. (4).

Figure 3:
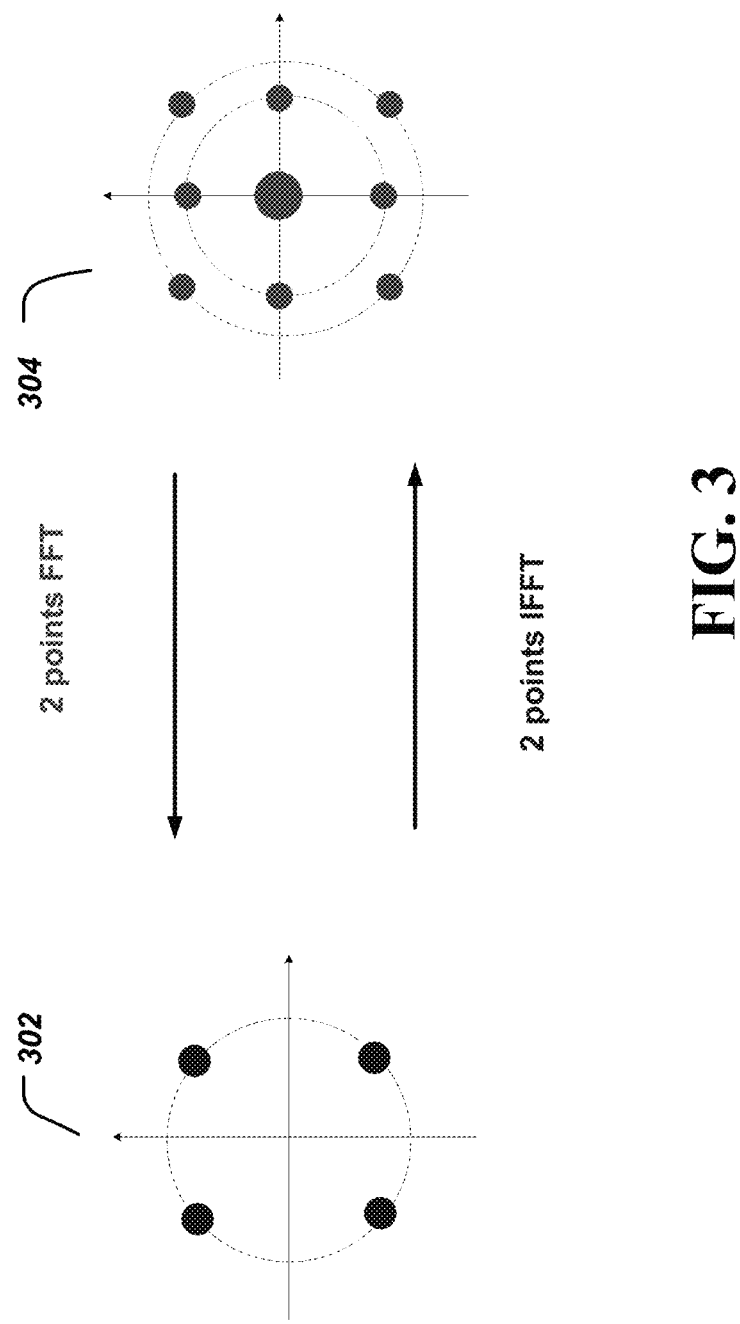
FIG. 3 depicts example constellations of a 4-QAM signal, and a corresponding 9 QAM signal.

In FIG. 3, the constellations of data on two subcarriers demonstrate as 4-QAM signal 302, while after IFFT the constellations of two time slots of OFDM symbols display as 9-QAM signal 304.

Figure 4:
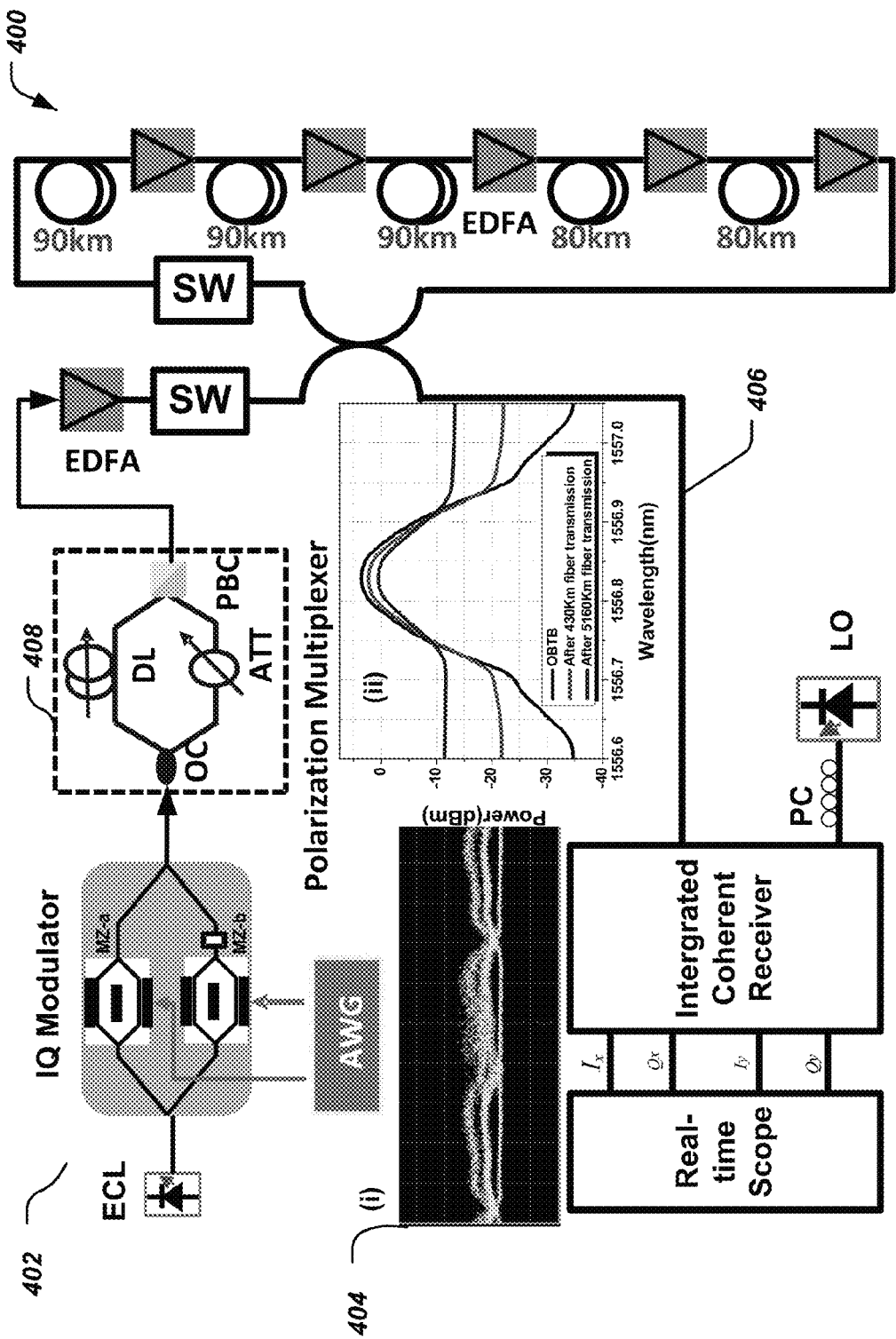
FIG. 4 depicts an example of an experimental setup of a 4-QAM CO-OFDM transmission system.

FIG. 4 shows an example setup 400 of a coherent optical OFDM (CO-OFDM) transmission system. At the transmitter 402, an external cavity laser (ECL) at 1557.04 nm with less than 100-kHz linewidth and maximum output power of 14.5 dBm is modulated by intensity Mach-Zehnder modulator (MZM) driven by an electrical baseband OFDM signal. The OFDM signal is generated by an arbitrary waveform generator (AWG) with a 12-GSa/s sample rate. Two types of OFDM signal transmissions are performed in the system for performance comparison. One is the traditional OFDM signal containing 256-subcarriers with frequency equalization via TS and a 32-samples cyclic prefix (CP) added to the 256 samples, while the other has only 2-subcarriers without additional CP and TS and the signal is equalized with CMMA blind equalization method. For optical OFDM modulation, two parallel Mach-Zehnder modulators (MZMs) in I/Q modulator are both biased at the null point and the phase difference between the upper and lower branches of I/Q modulator is controlled at $\pi/2$.

The polarization multiplexing is realized by a polarization multiplexer 408, comprising a polarization-maintaining optical coupler (OC) to split the signal into two branches, an optical delay line (DL) to remove the correlation between X-polarization and Y-polarization by providing a time delay, an optical attenuator to balance the power of two branches and a polarization beam combiner (PBC) to recombine the signal. The generated signal is boosted via an Erbium doped fiber amplifier (EDFA) before launched into an optical re-circulating loop. The optical re-circulating loop consists of 2 spans of 80 km and 3 spans of 90 km standard single mode fiber (SMF-28) and 5 EDFAs with 5 dB noise figure. The output signal is then injected into the integrated coherent receiver to implement optical to electrical detection In the 256-subcarriers case, 200 subcarriers are employed to convey data (information bits). The first subcarrier is set to zero for DC-bias and the rest 55 null subcarriers at the edge are reserved for oversampling and 8 pilot tones are reserved for phase recovery.

FIG. 5A is an example of the digital signal processing performed on the 256-subcarriers. In the transmitter, the pseudo random binary sequence (PRBS) is firstly mapped to 4-QAM, and then TS and pilot tones are added for frequency domain equalization. A 256-points IFFT is applied to convert the signal into time domain, and finally CP is added to the 256 samples. After optical link, in the receiver of traditional OFDM signal with 256-carriers, time synchronization is realized by the conjugate symmetric TS in time domain placed in the front of the frame at the transmitter, and FOC is implemented with the aid of the TS. After CP removing, FFT is applied to transform the OFDM into frequency domain and channel estimation is implemented by a pair of TSs orthogonal in time domain at the transmitter in two polarizations. After channel estimation, de-multiplexing can be realized in order to minimize crosstalk between two branches. One-tap zero-forcing equalization is used to equalize the signal, and the phase noise cancellation in two branches is implemented with the pilot tones inserted in each OFDM symbol. At last, the BER is obtained via bit error counting. The total bit rate of 256-subcarriers OFDM signal is 32.1 Gbit/s after removing overhead which include CP, TS, pilot tone and virtual subcarriers.

FIG. 5B depicts example processing for a 2-subcarriers scheme. In the transmitter, after 4-QAM mapping, the data on 2-subcarriers is converted to time domain via 2-points IFFT. This signal is received over the transmission medium at the receiver. In the receiver, the time domain signal is processed as a 9-QAM signal with three-level according to the analysis in this document and the optical eye diagram 404. After optical link, the 9-QAM signal can be equalized with CMMA method without additional overhead compared to traditional OFDM signal with frequency domain equalization. In the receiver, a T/2-spaced time-domain FIR filter is firstly used for channel distortion (CD) compensation, where the filter coefficients are calculated from a fiber CD transfer function that may be calculated, e.g., using the frequency-domain truncation method.

The cascaded multi-modulus algorithm (CMMA) is used to retrieve the modulus of the 9QAM signal and to perform polarization de-multiplexing. The FOC and phase recovery are performed subsequently. After these procedures, 2-point FFT is applied to convert the 9-QAM signal in time domain into 4-QAM signal in frequency domain and then the BER can also be obtained with the BER counting. As blind equalization is applied for 2-subcarriers OFDM signal, there is no overhead and the capacity is 48 Gbit/s. In this experiment, the BER is counted over $10 \times 10^6$ bits (10 data sets, and each set contains $10^6$ bits).

Figure 12:
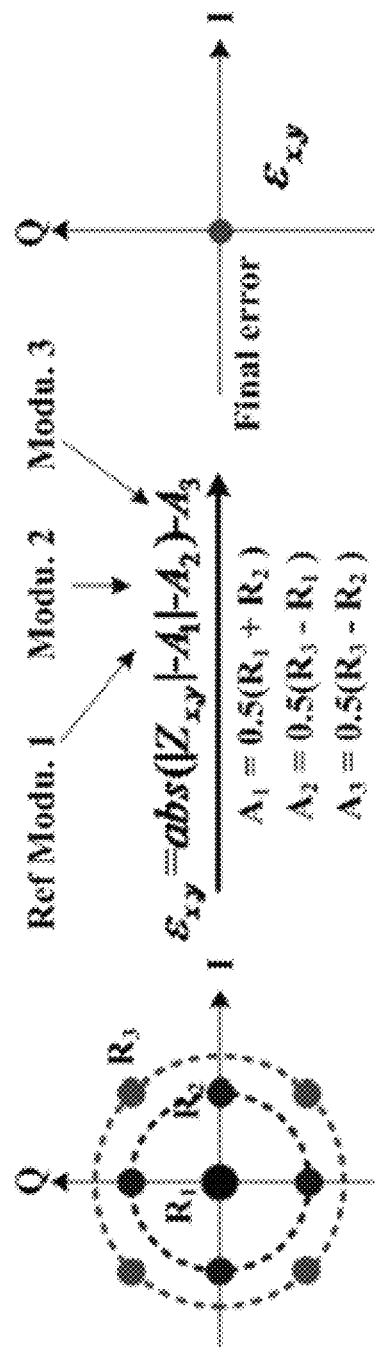
FIG. 12 depicts the principle of CMMA for QDB spectrum shaped PDM-QPSK.

Briefly, the CMMA algorithm could be operated upon 4 symbol QAM constellation, which could be considered mathematically to be a 4 Quadrature Phase Shift Keying (4 QPSK) signal. When the 4 QPSK signal is passed through a spectral shaping filter, e.g., two electrical low-pass filters on the two quadrature electrical signals or an optical bandpass filter after optical QPSK/QAM modulation, the resulting signal becomes a 9-point signal (QPSK or QAM). The 9-point symbol constellation can then be recovered using CMMA algorithm. Further details of CMMA are provided in Zhang et. al, Multi-Modulus Blind Equalizations for Coherent Quadrature Duobinary Spectrum Shaped PM-QPSK Digital Signal Processing, Journal of Lighwave Technology, Vol 31, No. 7, Apr. 1, 2013 ("Zhang"), which is incorporated by reference in its entirety herein. The principle of CMMA for quadrature duobinary (QDB) spectrum shaped PDM-QPSK signals are shown in FIG. 12. Here, $\epsilon_{x,y}$, is the feedback signal error for filter tap updating. The corresponding filter tap weight updating equalizations are given in the below Eq. 1-4 and $e_{x,y}(i)$ for QDB 9-point signal is given by Eq. 5. Here, $\hat{x}$ and $\hat{y}$ denote the complex conjugates of received signals x and y, respectively. Sign(x) is the sign function and µ is the convergence parameter. By introducing three reference circles $A_1 \sim A_3$, the final error can approach zero for ideal QDB signal as worked in 8QAM signals. $R_1 \sim R_2$ are the radius of the three modulus QDB PDM-QPSK signal and $Z_{x,y}$ is the output of the equalizer.

$$hxx(k) \rightarrow hxx(k)+\mu\epsilon_x(i)e_x(i)\hat{x}(i-k) \quad [\text{Eq. 1}]$$

$$hxy(k) \rightarrow hxy(k)+\mu\epsilon_x(i)e_x(i)\hat{y}(i-k) \quad [\text{Eq. 2}]$$

$$hyx(k) \rightarrow hyx+\mu\epsilon_y(i)e_y(i)\hat{x}(i-k) \quad [\text{Eq. 3}]$$

$$hyy(k) \rightarrow hyy(k)+\mu\epsilon_y(i)e_y(i)\hat{y}(i-k) \quad [\text{Eq. 4}]$$

$$e_{x,y}=\text{sign}(\|Z_{x,y}(i)|-A_1|-A_2)\cdot\text{sign}(|Z_{x,y}(i)|-A_1)\cdot\text{sign}(Z_{x,y}(i)) \quad [\text{Eq. 5}]$$

Figure 6:
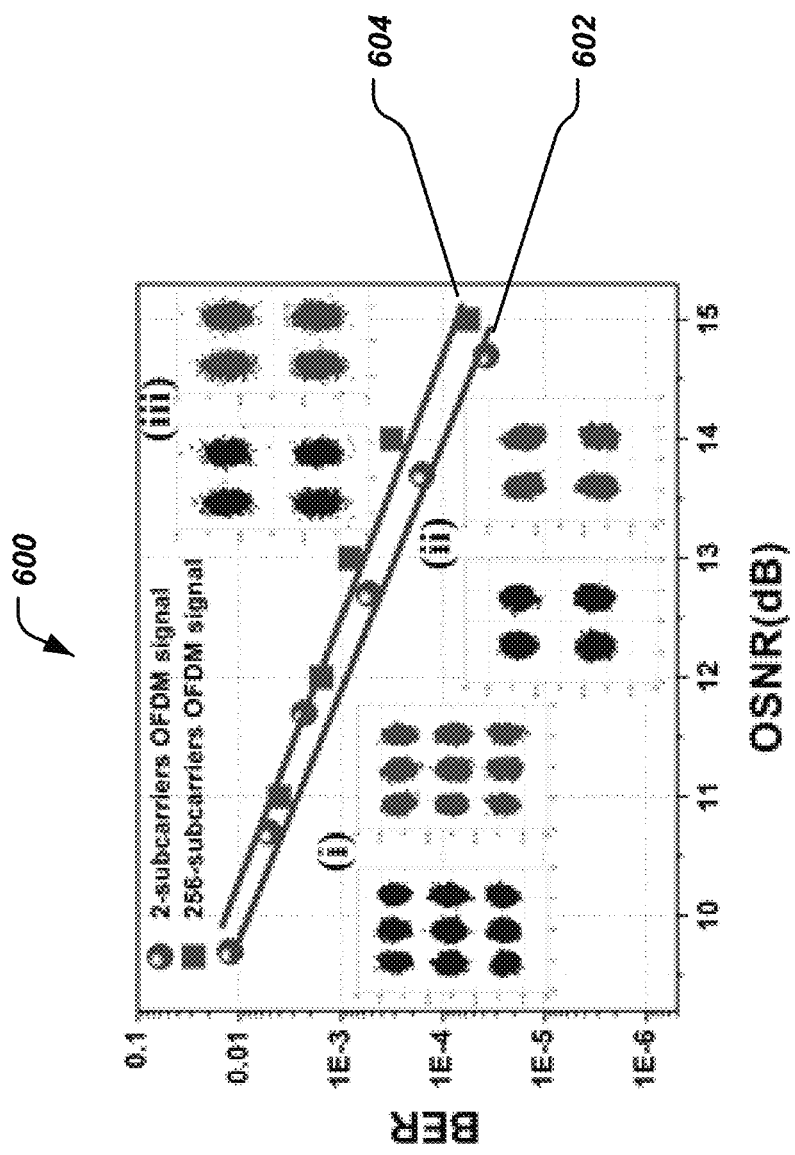
FIG. 6 is a graphical representation of an example of measured back to back (B2B) bit error rate (BER) of two types of OFDM signal versus optical signal to noise ratio (OSNR).

FIG. 6 shows an example of a graph 600 for the measured back to back (BTB) BER of two types of OFDM signal. Compared to OFDM signal with 2-subcarriers (curve 602), there is about 0.3-dB OSNR penalty at the BER of $3.8 \times 10^{-3}$ for 256-subcarriers OFDM signal (curve 604). This penalty is mainly induced by the high PAPR of 256-subcarriers OFDM signal. The PAPR of OFDM signal with 256-subcarriers is expected to be much higher than three-level (9QAM) OFDM signal with 2-subcarriers. A nonlinear signal component is easily generated for signal with high PAPR during digital to analog conversion with AWG. As the resolution of DAC in the AWG is 10, the nonlinear distortion is not very serious when the number of subcarriers is increased to 256.

The constellations of dual polarization 2-subcarriers OFDM signal after phase recovery with OSNR @17 dB are shown in the inset (i) of FIG. 6 and the signal is converged into 9QAM in time domain. The 9QAM can be re-sorted into 4QAM after FFT and the constellations of dual polarization after this procedure are shown in the inset (ii) of FIG. 6. While for the 256-subcarriers OFDM signal, the constellations of dual-polarizations signal with OSNR @17 dB after pilot based phase recovery are shown as FIG. 6, inset (iii). Compared to the constellations of OFDM signal with 256-subcarrriers at the same OSNR, these of OFDM with 2-subcarriers are more concentrated due to the low PAPR.

The Optical spectrum of optical OFDM signal after different transmission distance with 0.1-nm resolution is shown in the inset chart 406 of FIG. 4.

Figure 7:
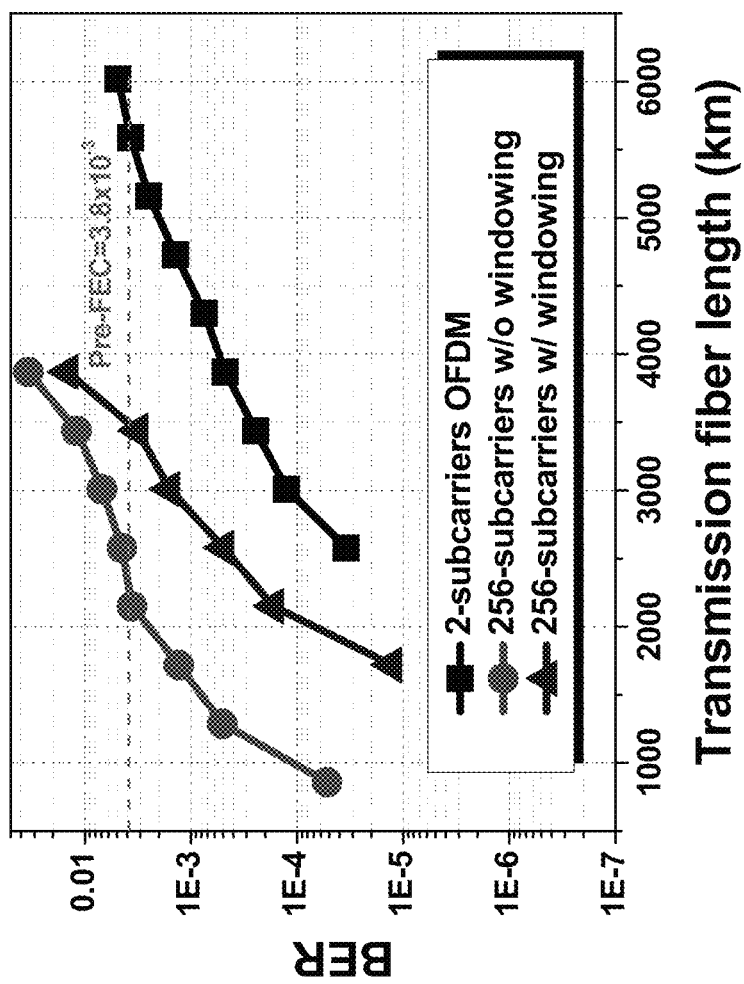
FIG. 7 is a graphical representation of an example of the measured BER versus transmission fiber length for two types of OFDM signals.

FIG. 7 shows the measured BER versus transmission fiber length for two types of OFDM signal: 48 Gbit/s dual-polarization 2-subcarriers OFDM signal can be transmitted 5600-km SMF-28, while the 32.1 Gbit/s dual-polarization traditional 256-subcarriers OFDM signal can be only transmitted 2300-km under the pre-FEC threshold of $3.8 \times 10^{-3}$. In the traditional OFDM transmission system, windowing can be used to eliminate the impact of sampling error and residual frequency offset, and the transmission distance can be extended to 3500-km. However, it is still much shorter than that of OFDM with 2-subcarriers. The nonlinear distortion in the fiber transmission for 2-subcarriers OFDM signal is relatively less than 256-subcarriers traditional OFDM signal as the PAPR is very low. Thus, the nonlinear effect resistance and transmission distance of 2-subcarriers OFDM with blind equalization can be enhanced compared with tradition OFDM transmission system based on frequency equalization with training sequence.

Figures 8A, 8B:
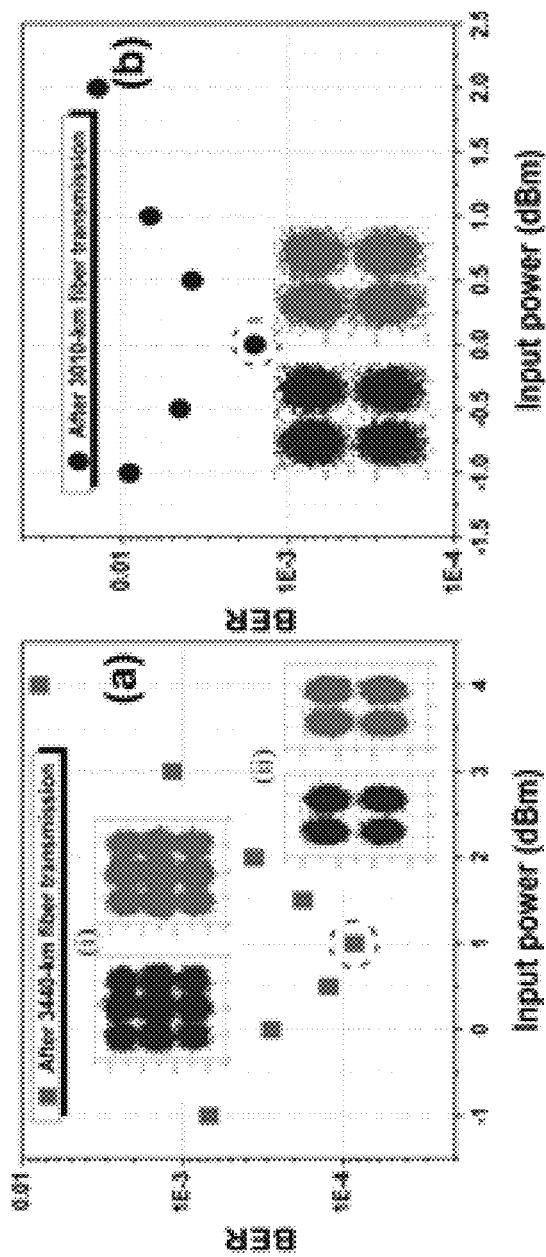
FIGS. 8A-8B are a graphical representation of an example of the measured BER versus input power, (8A) 2-subcarriers OFDM signal, (8B) 256-subcarriers OFDM signal.

FIG. 8A shows the measured BER versus input power of 2-subcarriers OFDM signal with 3440-km fiber transmission. The optimal input power is 1 dBm and the constellations of dual polarizations signal after phase recovery and after FFT are both inserted in FIG. 8A as insets (i) and (ii), respectively.

FIG. 8B shows the measured BER versus input power of 256-subcarriers traditional OFDM signal with 3010-km fiber transmission. The optimal input power is 0 dBm and the constellations of dual-polarization after phase recovery are inserted as inset in FIG. 8B. The 2-subcarriers OFDM signal with blind equalization has better nonlinear performance due to its lower PAPR and higher SE as no additional overhead is needed for the equalization.

Figure 9:
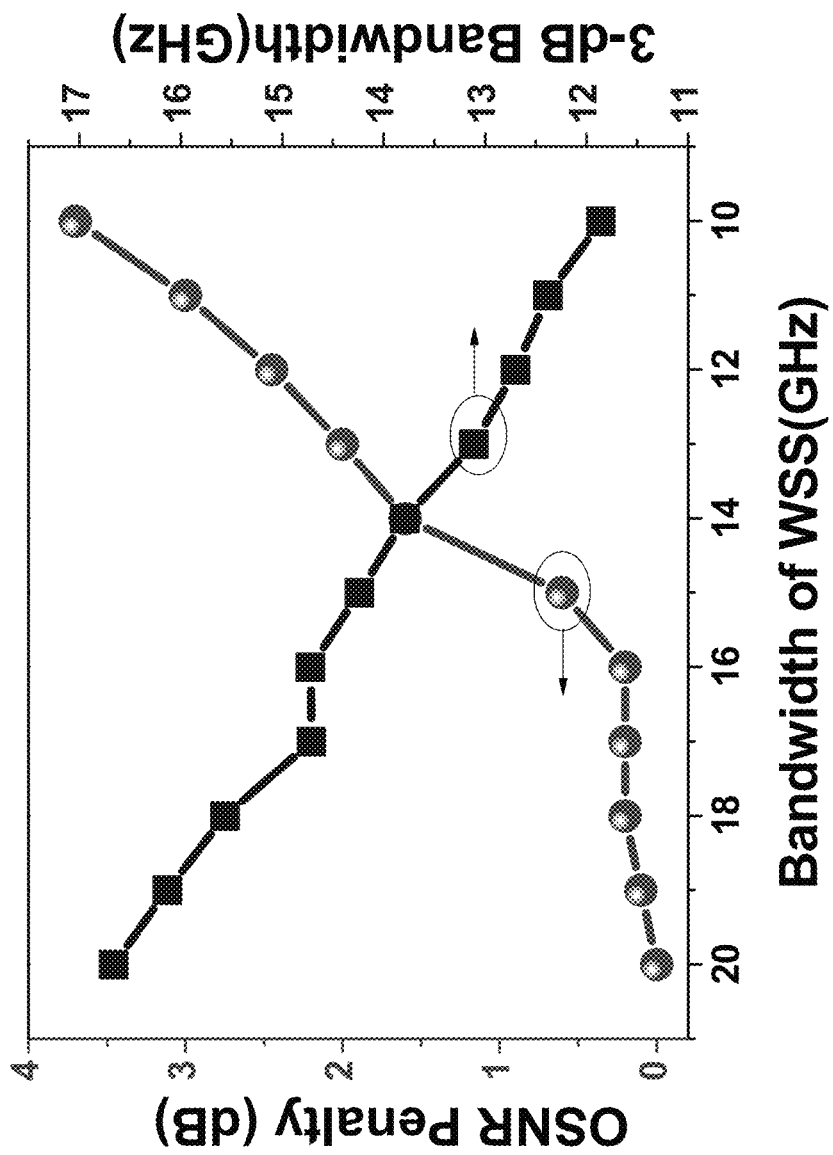
FIG. 9 depicts example measured back to back (BTB) OSNR penalty and 3-dB bandwidth versus bandwidth of wavelength selective switch (WSS).

In the BTB case, a wavelength selective switch (WSS) is used as an optical tunable filter to determine the minimum bandwidth for the 48 Gbit/s 2-subcarriers OFDM signal transmission. FIG. 9 shows the measured BTB OSNR penalty and 3-dB bandwidth versus bandwidth of WSS. The BTB OSNR penalty can be neglected when the bandwidth of WSS is set to 15 GHz and the 3-dB bandwidth is 14.3 GHz.

In this document, a 2-subcarriers dual-polarization OFDM signal transmission system is with blind equalization is disclosed. In one advantageous aspect, immunity to the nonlinear effects introduced by a transmission channel and signal degradation due to the transmission distance can be enhanced compared with tradition dual OFDM transmission system based on frequency equalization with training sequence.

Figure 10:
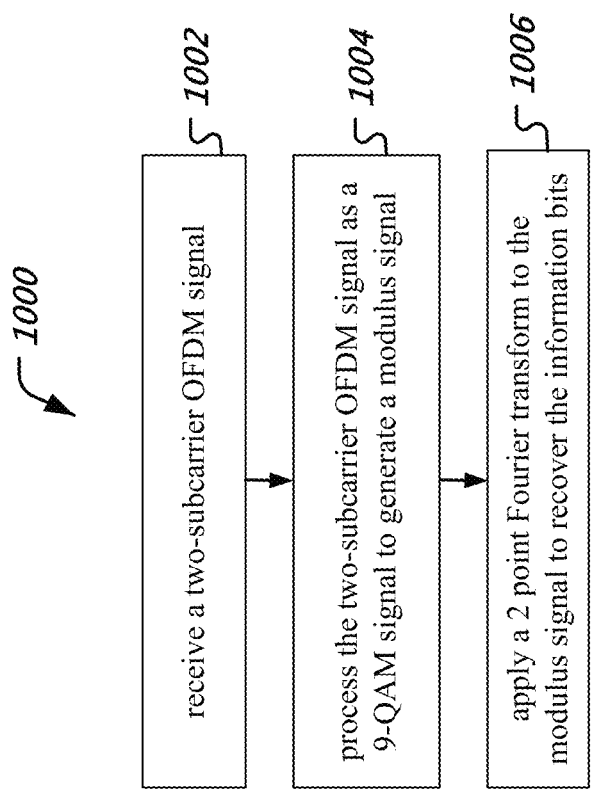
FIG. 10 is a flow chart representation of an example process of optical communication.

FIG. 10 is a flowchart representation of an example of a method 1000 of optical communication. The method 1000 recovers information bits from a two-subcarrier orthogonal frequency division multiplexed (OFDM) signal in which each subcarrier is modulated using a 4 Quadrature Amplitude Modulation (QAM) constellation. In other words, the signal carrying information bits is transmitted without incurring the overhead of training sequence transmission and/or pilot tone transmission.

At 1002, the method 1000 receives the two-subcarrier OFDM signal. The reception is performed, e.g., at the previously discussed optical communication apparatuses 102 and 106. The received signal may also, in addition, use polarization multiplexing, as previously disclosed. The polarization multiplexed signal can be demultiplexed into individual polarization components prior to recovering information bits.

At 1004, the method 100 processes the two-subcarrier OFDM signal as a 9-QAM signal to generate a modulus signal. Zhang provides examples of a cascaded multimodulus algorithm that can be used to perform signal processing operations on the received signal by treating the received signal as being a 9 QAM signal, as previously discussed. The CMMA may include performing channel equalization of the received two-subcarrier OFDM signal to obtain a set of channel estimation coefficients and a stream of symbols, partitioning, based on a modulus of the stream of symbols, the stream of symbols into three partitions, estimating a carrier frequency offset based on the partitioned stream of symbols and recovering a phase of the received two-subcarrier OFDM signal using a maximum likelihood algorithm. As further disclosed in Zhang, constellation points may be rotated during the receiver processing. In some embodiments, the rotation may be performed during carrier frequency offset estimation. In some embodiments, the rotation may be performed during phase recovery.

At 1006, the method applies a 2 point Fourier transform to the modulus signal to recover the information bits. The information bits are recovered by demodulating the modulus signal output and making bit decisions.

Figure 11:
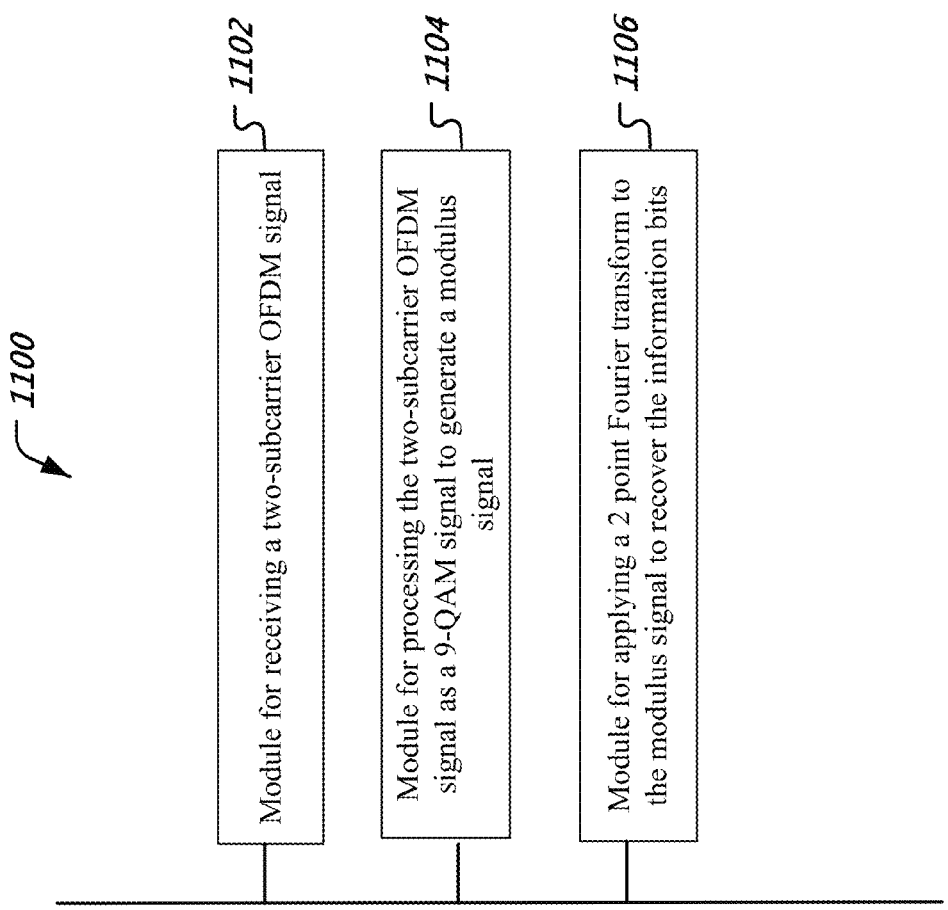
FIG. 11 is a block diagram representation of an example apparatus for wireless communications.

FIG. 11 is a block diagram representation of an example of an apparatus 1100 for optical communication. The apparatus 1100 may be configured to recover information bits from a two-subcarrier orthogonal frequency division multiplexed (OFDM) signal in which each subcarrier is modulated using a 4 Quadrature Amplitude Modulation (QAM) constellation. The module 1102 (e.g., an optical receiver module) is for receiving the two-subcarrier OFDM signal. The module 1104 (e.g., a receiver processing module) is for processing the two-subcarrier OFDM signal as a 9-QAM signal to generate a modulus signal. The module 1106 (e.g., an FFT module) is for applying a 2-point FFT to the modulus signal to recover the information bits. The apparatus 1100 and modules 1102, 1104 and 1106 may be further configured to perform some of the techniques disclosed in this document.

It will be appreciated that various techniques are disclosed for achieving high data throughput in optical communication.

It will further be appreciated that techniques transmitting optical OFDM communication signals without having to incur overheads of pilot tones and training sequences are disclosed. A 2-subcarriers OFDM signal is used for carrying information bits from a transmitter to a receiver. At the receiver, the signal is received and processed using a blind equalization method in which receiver processing is performed on the signal to recover information by treating the received signal as having 9-QAM constellation points.

It will further be appreciated that while the disclosed embodiments are described with reference to optical communication, the disclosed signal processing techniques apply equally well to any other OFDM communication medium, e.g., copper wire, coaxial cable or air medium (wireless).

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for recovering information bits from a two-subcarrier orthogonal frequency division multiplexed (OFDM) signal in which each subcarrier is modulated using a 4 Quadrature Amplitude Modulation (QAM) constellation, comprising:
    receiving the two-subcarrier OFDM signal;
    processing the two-subcarrier OFDM signal as a 9-QAM signal to generate a modulus signal; and
    applying a 2 point Fourier transform to the modulus signal to recover the information bits.

2. The method of claim 1, wherein the processing comprises using a cascaded multi-modulus algorithm (CMMA), wherein the CMMA comprises:
    performing channel equalization of the received two-subcarrier OFDM signal to obtain a set of channel estimation coefficients and a stream of symbols;
    partitioning, based on a modulus of the stream of symbols, the stream of symbols into three partitions;
    estimating a carrier frequency offset based on the partitioned stream of symbols;
    recovering a phase of the received two-subcarrier OFDM signal using a maximum likelihood algorithm.

3. The method of claim 2, further including:
    rotating at least some constellation points.

4. The method of claim 3, wherein the rotating operation is performed during the operation of estimating the carrier frequency offset.

5. The method of claim 3, wherein the rotating operation is performed during the operation of recovering the phase of the signal.

6. An optical receiver apparatus for recovering information bits from a two-subcarrier orthogonal frequency division multiplexed (OFDM) signal in which each subcarrier is modulated using a 4 Quadrature Amplitude Modulation (QAM) constellation, comprising:
    an optical receiver module that receives the two-subcarrier OFDM signal;
    a receiver processing module that processes the two-subcarrier OFDM signal as a 9-QAM signal to generate a modulus signal;
    a Fourier transform module that applies a 2 point Fourier transform to the modulus signal to recover the information bits.

7. The apparatus of claim 6, wherein the processing comprises using a cascaded multi-modulus algorithm (CMMA), wherein the CMMA comprises:
 performing channel equalization of the received two-subcarrier OFDM signal to obtain a set of channel estimation coefficients and a stream of symbols;
 partitioning, based on a modulus of the stream of symbols, the stream of symbols into three partitions;
 estimating a carrier frequency offset based on the partitioned stream of symbols;
 recovering a phase of the received two-subcarrier OFDM signal using a maximum likelihood algorithm.

8. The apparatus of claim 7, further including:
 a constellation rotation module that rotates at least some constellation points.

9. The apparatus of claim 8, wherein the constellation rotation module performs the rotating operation during the operation of estimating the carrier frequency offset.

10. The apparatus of claim 8, wherein the constellation rotation module performs the rotating operation during the operation of recovering the phase of the signal.

11. An optical communication apparatus, comprising:
 an optical receiver that receives a two-subcarrier orthogonal frequency division multiplexed (OFDM) signal whose subcarriers have been modulated using a 4 Quadrature Amplitude Modulation (QAM) constellation;
 a memory that stores instructions;
 a processor that reads the instructions from the memory, processes the two-subcarrier OFDM signal as a 9-QAM signal to generate a modulus signal, and applies a 2 point Fourier transform to the modulus signal to recover the information bits.

12. The apparatus of claim 11, wherein the processor further
 performs channel equalization of the received two-subcarrier OFDM signal to obtain a set of channel estimation coefficients and a stream of symbols;
 partitions, based on a modulus of the stream of symbols, the stream of symbols into three partitions;
 estimates a carrier frequency offset based on the partitioned stream of symbols;
 recovers a phase of the received two-subcarrier OFDM signal using a maximum likelihood algorithm.

13. The apparatus of claim 12, wherein the processor further:
 rotates at least some constellation points.

14. The apparatus of claim 13, wherein the processor rotates at least some constellation points and estimates the carrier frequency offset based on the partitioned stream of symbols at least partially concurrently.

15. The apparatus of claim 13, wherein the processor rotates at least some constellation points and recovers the phase of the received two-subcarrier OFDM signal at least partially concurrently.

16. An optical communication system, comprising:
 an optical transmission medium;
 an optical transmission apparatus transmits, over the optical transmission medium, a two-subcarrier orthogonal frequency division multiplexed (OFDM) signal in which each subcarrier is modulated using a 4 Quadrature Amplitude Modulation (QAM) constellation without transmitting a training sequence and a pilot signal; and
 an optical receiver apparatus that:
 receives the two-subcarrier OFDM signal;
 processes the two-subcarrier OFDM signal as a 9-QAM signal to generate a modulus signal; and
 applies a 2 point Fourier transform to the modulus signal to recover the information bits.

17. The system of claim 16, wherein the processing comprises using a cascaded multi-modulus algorithm (CMMA), wherein the CMMA comprises:
 performing channel equalization of the received two-subcarrier OFDM signal to obtain a set of channel estimation coefficients and a stream of symbols;
 partitioning, based on a modulus of the stream of symbols, the stream of symbols into three partitions;
 estimating a carrier frequency offset based on the partitioned stream of symbols;
 recovering a phase of the received two-subcarrier OFDM signal using a maximum likelihood algorithm.

18. The system of claim 17, wherein the optical receiver apparatus further:
 rotates at least some constellation points.

19. The system of claim 18, wherein the rotating operation is performed during the operation of estimating the carrier frequency offset.

20. The system of claim 18, wherein the rotating operation is performed during the operation of recovering the phase of the signal.

* * * * *